United States Patent
Lee et al.

(10) Patent No.: US 11,995,487 B2
(45) Date of Patent: May 28, 2024

(54) IDENTIFY TYPE OF SCREEN ACCORDING TO IMAGE QUALITY OF IMAGE FORMING APPARATUS

(71) Applicant: Hewlett-Packard Development Company, L.P., Spring, TX (US)

(72) Inventors: Kiyoun Lee, Seongnam-si (KR); Kimin Kang, Seongnam-si (KR); Yousun Bang, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/018,763

(22) PCT Filed: Jan. 22, 2021

(86) PCT No.: PCT/US2021/014528
§ 371 (c)(1),
(2) Date: Jan. 30, 2023

(87) PCT Pub. No.: WO2022/046161
PCT Pub. Date: Mar. 3, 2022

(65) Prior Publication Data
US 2023/0297797 A1  Sep. 21, 2023

(30) Foreign Application Priority Data
Aug. 25, 2020  (KR) .................. 10-2020-0106899

(51) Int. Cl.
*G06K 15/02* (2006.01)
*G03G 15/00* (2006.01)
*G06K 15/00* (2006.01)

(52) U.S. Cl.
CPC ....... *G06K 15/027* (2013.01); *G03G 15/5016* (2013.01); *G06K 15/002* (2013.01); *G06K 15/1881* (2013.01)

(58) Field of Classification Search
None
See application file for complete search history.

(56) References Cited

U.S. PATENT DOCUMENTS

| 7,830,569 B2 | 11/2010 | Tai et al. |
| 2002/0008880 A1 | 1/2002 | Dewitte et al. |

(Continued)

FOREIGN PATENT DOCUMENTS

| JP | 2002-031939 A | 1/2002 |
| JP | 2009-031671 A | 2/2009 |

(Continued)

*Primary Examiner* — Andrew H Lam
(74) *Attorney, Agent, or Firm* — Brooks, Cameron & Huebsch, PLLC

(57) ABSTRACT

An example operation method of an image forming apparatus includes forming a test image with respect to a pattern used for diagnosing an image-quality state of a printout output by the image forming apparatus, obtaining a test signal corresponding to the test image via a sensor of the image forming apparatus, obtaining image-quality state information indicating an image-quality state of the test image based on the test signal corresponding, identifying a type of a screen corresponding to halftone information indicating a resolution of the printout based on the image-quality state information, and performing a first image forming operation according to the type of the screen.

15 Claims, 11 Drawing Sheets

(56) References Cited

U.S. PATENT DOCUMENTS

| | | | |
|---|---|---|---|
| 2005/0117928 A1* | 6/2005 | Hino | G03G 15/0131 |
| | | | 399/49 |
| 2012/0243897 A1* | 9/2012 | Atsumi | G03G 15/5041 |
| | | | 399/74 |
| 2013/0017493 A1 | 1/2013 | Cook et al. | |
| 2013/0321870 A1* | 12/2013 | Hahm | G06K 15/1881 |
| | | | 358/3.06 |

FOREIGN PATENT DOCUMENTS

| | | |
|---|---|---|
| JP | 2013-154610 A | 8/2013 |
| KR | 10-2001-0010298 A | 2/2001 |

* cited by examiner

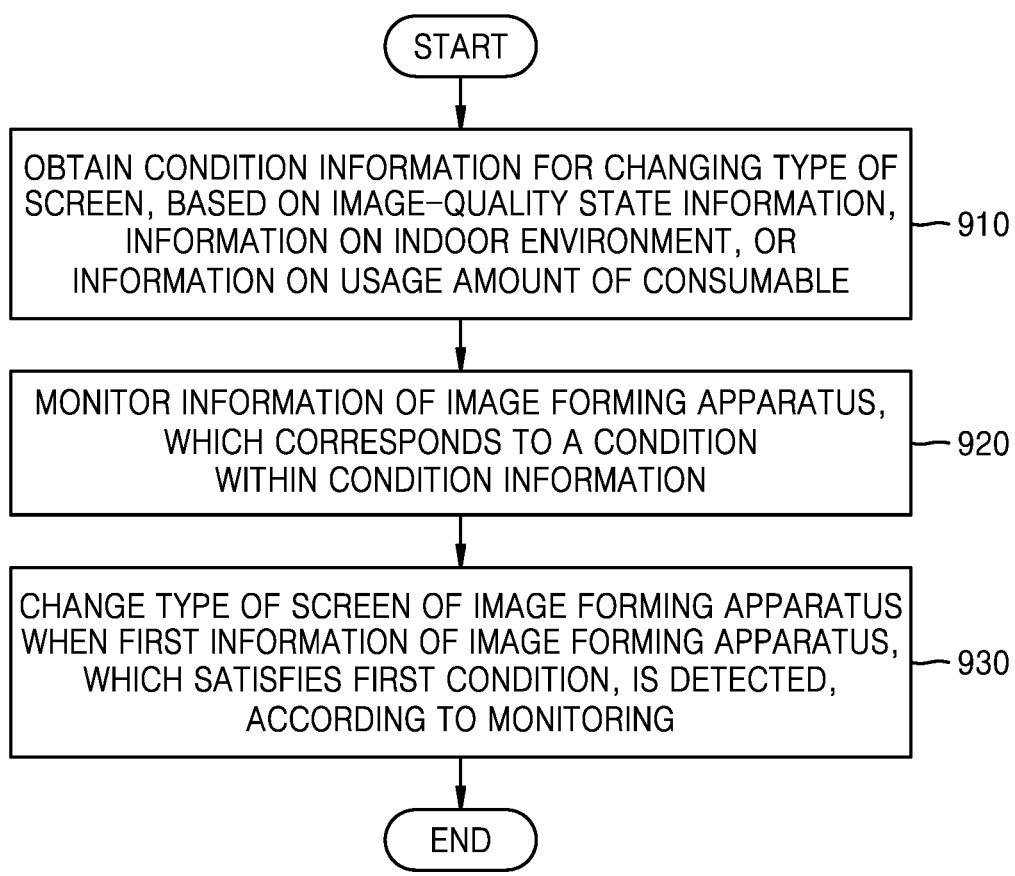

IDENTIFY TYPE OF SCREEN ACCORDING TO IMAGE QUALITY OF IMAGE FORMING APPARATUS

BACKGROUND

Halftoning refers to a technique of generating a plurality of patterns, in which a thickness or density of dots is differently set, and expressing contrast by using a certain pattern according to the brightness of a certain area of an image. An image forming apparatus may output a printout by using a halftoning technique.

BRIEF DESCRIPTION OF THE DRAWINGS

FIG. 9 is a flowchart illustrating a method of an image forming apparatus that monitors information of the image forming apparatus based on condition information for changing a type of a screen, and changes the type of the screen according to a result of the monitoring, according to an example.

DETAILED DESCRIPTION

Figure 1:
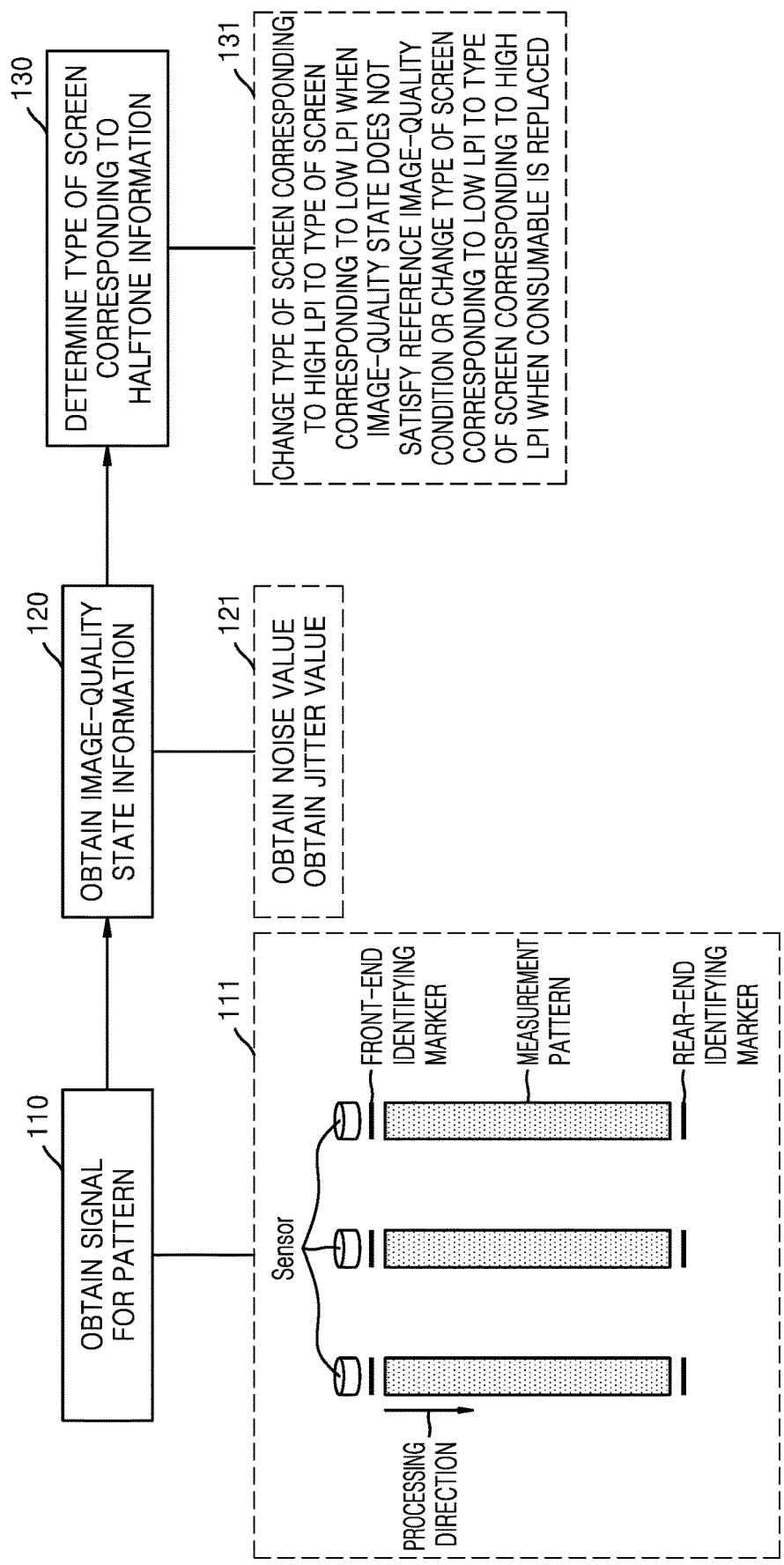
FIG. 1 illustrates a process of identifying a type of a screen based on image-quality state information obtained from a signal for a pattern, according to an example.

Examples of the present disclosure will be described hereinafter with reference to the accompanying drawings so as to be easily implemented by one of ordinary skill in the art to which the present disclosure belongs. However, the present disclosure may be embodied in many different forms and is not limited to the examples set forth herein.

The term "image forming apparatus" may be any type of apparatus, such as a printer, a copier, a scanner, a fax machine, a multi-function printer (MFP), or a display apparatus, which can perform an image forming operation. In addition, an image forming apparatus may be a 2D image forming apparatus or a 3D image forming apparatus. An "image forming operation performed by an image forming apparatus" may involve printing, copying, scanning, faxing, saving, transmission, coating, or the like.

An image-quality state of a printout output by an image forming apparatus may deteriorate over time. For example, deterioration may occur due to a process deviation of a component within the image forming apparatus or due to aging of a component on account of use of the component within the image forming apparatus. In this case, the image-quality state of the printout may be improved by replacing a component having a large process deviation or an aged component. In addition, in order to avoid deterioration of the image-quality state of the printout, the image forming apparatus may change halftone information set in the image forming apparatus to thereby reduce noise or jitter appearing on the printout. As an example, the image forming apparatus may identify, based on image-quality state information, a type of a screen corresponding to the halftone information and may perform the image forming operation according to the type of the screen.

The term "image-quality state information" may refer to information indicating a state with respect to gradation, color balance, color reproducibility, contrast, sharpness, or the like, which is expressed in a printout or an image. The sharpness refers to a degree to which an image is clearly visible and refers to information with clear image detail. In addition, the "image-quality state information" may be expressed as numerical information according to a degree to which noise or jitter is included in a printout or an image. For example, in an area including noise, an original image may not be clearly visible, may be blurred, may appear hazy, or the like. In addition, in an area including noise, a dot or a line, which is irrelevant to the original image, may be detected. For example, in an area including jitter, a vertical line or a horizontal line may be detected.

The "image-quality state information" may include a noise value or a jitter value. The greater the noise value, the more noise may be included in a printout or an image. In addition, the greater the jitter value, the more jitter may be included in a printout or an image.

The term "type of a screen" may be classified according to halftone information. The type of the screen may be a pattern corresponding to the halftone information applied when the image forming operation is performed in the image forming apparatus. For example, the halftone information may indicate arrangement information of halftone dots in the screen or may include information about a number of lines corresponding to the halftone dots per inch in the screen. In other words, the halftone information may include lines per inch (LPI) information. In addition, the halftone information may include angle information due to arrangement of the halftone dots. The angle information may be set according to a color of cyan (C), magenta (M), yellow (Y), or black (K).

FIG. 1 illustrates a process of identifying a type of a screen based on image-quality state information obtained from a signal for a pattern, according to an example.

Referring to a block 110 of FIG. 1, an image forming apparatus may obtain a signal for a pattern used for diagnosing an image-quality state of a printout. For example, the image forming apparatus may form a test image with respect to the pattern on an image transfer belt (ITB), and a sensor within the image forming apparatus may obtain a test signal corresponding to the test image. As shown in an image 111 of FIG. 1, the sensor may obtain a signal for a measurement pattern in a processing direction of an image forming operation based on a front-end identifying marker and a rear-end identifying marker of the measurement pattern.

Referring to a block 120 of FIG. 1, the image forming apparatus may obtain image-quality state information indicating an image-quality state of the test image based on the signal obtained from the sensor. For example, the image-quality state information may indicate index information on a factor that deteriorates image quality of the test image. For example, the image-quality state information may include a measurement value with respect to noise or jitter appearing in the test image. Referring to a block 121 of FIG. 1, the image forming apparatus may obtain a noise value or a jitter value based on the signal obtained from the sensor.

Referring to a block 130 of FIG. 1, the image forming apparatus may identify a type of a screen corresponding to halftone information based on the image-quality state information. For example, referring to a block 131 of FIG. 1, when the image-quality state does not satisfy a reference image-quality condition, the image forming apparatus may change a type of a screen corresponding to a high LPI to a type of a screen corresponding to a low LPI.

In addition, in a state where the type of the screen corresponding to the low LPI is set in the image forming apparatus, when a consumable in the image forming apparatus is replaced, the image forming apparatus may change the type of the screen corresponding to the low LPI to the type of the screen corresponding to the high LPI.

In an example, the image forming apparatus may periodically obtain a signal for a pattern and may monitor an image-quality state information indicating an image-quality state of a test image. The image forming apparatus may identify a type of a screen corresponding to halftone information, according to a result of the monitoring.

Figure 2:
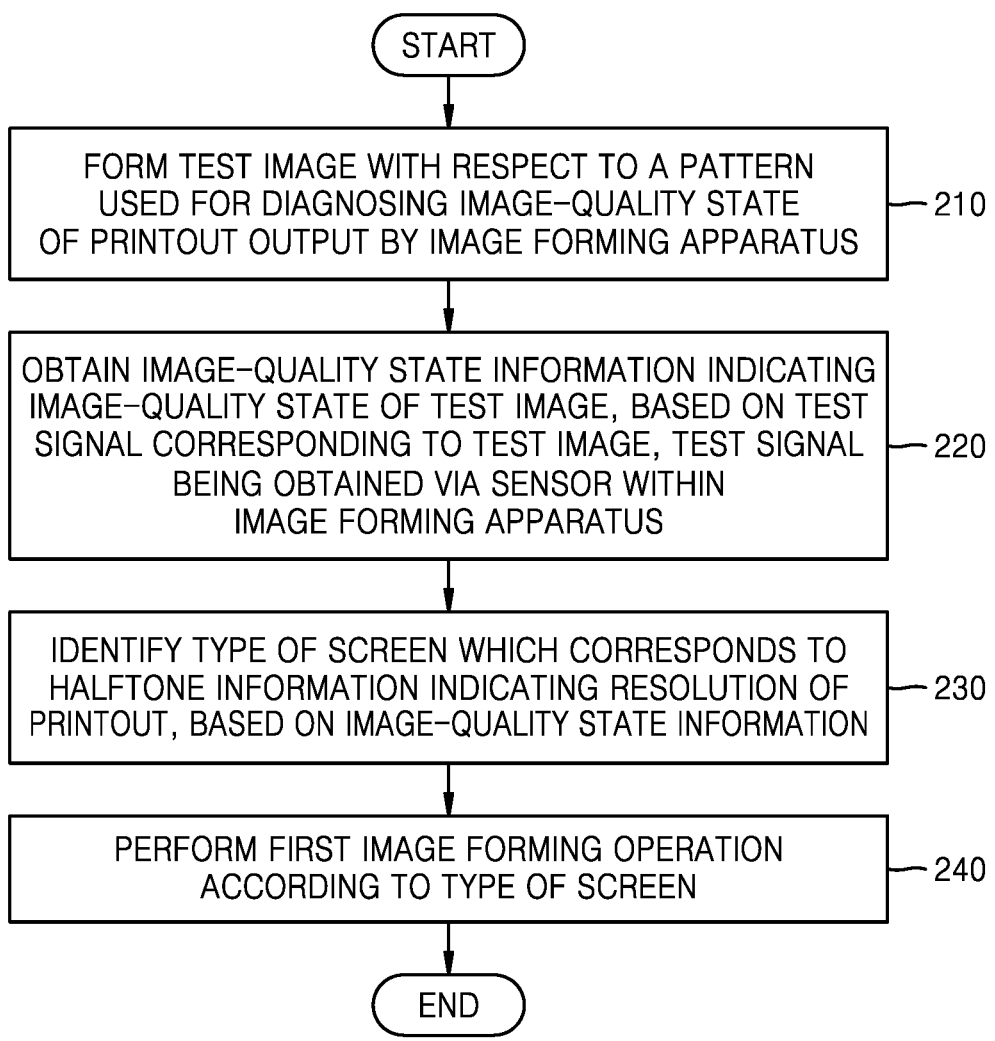
FIG. 2 is a flowchart illustrating a method of an image forming apparatus that identifies a type of a screen according to image-quality state information, according to an example.

FIG. 2 is a flowchart illustrating a method of an image forming apparatus that identifies a type of a screen according to image-quality state information, according to an example.

Referring to FIG. 2, the image forming apparatus may form a test image with respect to a pattern used for diagnosing an image-quality state of a printout output by the image forming apparatus in operation 210. For example, the pattern may indicate a single density for a certain color and may have a certain width and a certain length. For example, a width may be set to be greater than or equal to a threshold width at which the sensor may detect a pattern. For example, a length may be set based on a measurement margin of a pattern and a multiple of a circumference of an organic photoconductor (OPC).

For example, the image forming apparatus may set a period based on a reference number of pages for printing a printout output by the image forming apparatus, a reference usage amount of a consumable within the image forming apparatus, or the like. The image forming apparatus may form a test image with respect to a pattern on the ITB according to the period.

For example, the reference number of pages for printing may be 2,000, and whenever 2,000 pages of printouts are output by the image forming apparatus, the image forming apparatus may form a test image with respect to a pattern on the ITB.

For example, a consumable within the image forming apparatus may be an OPC. For example, a reference usage amount of the OPC may be 12,000 revolutions, and whenever a number of revolutions of the OPC reaches 12,000, the image forming apparatus may form a test image with respect to a pattern on the ITB.

In operation 220, the image forming apparatus may obtain image-quality state information indicating an image-quality state of the test image based on a test signal corresponding to the test image. In an example, the test signal corresponding to the test image is obtained via the sensor within the image forming apparatus.

For example, the image-quality state of the test image may represent a state with respect to gradation, color balance, color reproducibility, contrast, sharpness, or the like, which are expressed in the test image. The image-quality state of the test image may be deteriorated as more noise or jitter is included in the test image. Accordingly, the image-quality state of the test image may be determined by a degree to which noise or jitter is included in the test image. The image-quality state information may include numerical information indicating a degree to which noise or jitter is included in the test image.

For example, the image forming apparatus may calculate a first standard deviation of the test signal. The image forming apparatus may obtain the first standard deviation as a first image-quality state value indicating the image-quality state of the test image.

For example, the image forming apparatus may obtain a signal by removing a low-frequency signal component from the test signal. The image forming apparatus may calculate a second standard deviation with respect to the signal obtained by removing the low-frequency signal component from the test signal. The image forming apparatus may obtain the second standard deviation as a second image-quality state value indicating the image-quality state of the test image.

For example, the image forming apparatus may obtain a signal by removing the low-frequency signal component and a high-frequency signal component from the test signal. The image forming apparatus may calculate a third standard deviation with respect to the signal obtained by removing the low-frequency signal component and the high-frequency signal component from the test signal. The image forming apparatus may obtain the third standard deviation as a third image-quality state value indicating the image-quality state of the test image.

In operation 230, the image forming apparatus may identify a type of a screen which corresponds to halftone information indicating a resolution of the printout based on the image-quality state information.

For example, the identifying of the type of the screen may include detecting a type of a screen corresponding to the image-quality state information among a plurality of types of screens, and determining the detected type of the screen as the type of the screen to be applied during the image forming operation. For example, a plurality of screens may be classified into a plurality of types according to LPI. A difference in a level of LPI between a plurality of screen types may be preset by a user or may be constant.

For example, the halftone information may indicate arrangement information of halftone dots in the screen. For example, the arrangement information may include information about a number of lines corresponding to the halftone dots per inch in the screen.

For example, when a first image-quality state corresponding to the image-quality state information does not satisfy a reference image-quality condition, the image forming apparatus may change a type of a first screen corresponding to a first LPI set in the image forming apparatus to a type of a second screen corresponding to a second LPI less than the first LPI. For example, the first LPI may be 212, and the second LPI may be 141.

For example, a reference image-quality value within the reference image-quality condition may be a threshold value for changing the type of the screen. For example, when a first reference image-quality value is set to 3, and the first image-quality state value is obtained as 3.2, the image forming apparatus may change a high LPI to a low LPI. In other words, the image forming apparatus may identify a type of a screen as a type of a screen corresponding to an LPI less than an LPI set in the image forming apparatus.

In addition, when a second reference image-quality value is set to 6, and the second image-quality state value, which is obtained after the first image-quality state value, is obtained as 6.1, the image forming apparatus may change the low LPI to a very low LPI. For example, the high LPI may be 212, the low LPI may be 141, and the very low LPI may be 106.

In addition, a number of times an image-quality state value exceeds a reference image-quality state value may also be a factor for changing the type of the screen. For example, when the number of times the image-quality state value exceeds the reference image-quality state value is 5 or more, the image forming apparatus may change a high LPI to a low LPI. In other words, the image forming apparatus may identify a type of a screen as a type of a screen corresponding to an LPI less than an LPI set in the image forming apparatus.

For example, when a first consumable within the image forming apparatus is replaced, the image forming apparatus may change the type of the second screen to the type of the first screen. Here, information on a usage amount of the first consumable may be used to determine the first image-quality state. In an example, when the first consumable is replaced with a new consumable, the image forming apparatus may determine that the image-quality state is improved in comparison with the previous image-quality state, and may change a low LPI to a high LPI. In other words, the image forming apparatus may change the type of the screen to the type of the first screen corresponding to the first LPI greater than the second LPI set before the first consumable is replaced.

In addition, the image forming apparatus may map a plurality of pieces of image-quality state information with information on the type of the screen corresponding to the plurality of pieces of image-quality state information and store a mapping result. Here, the information on the type of the screen corresponding to the image-quality state information may be information on the type of the screen to be applied according to a range of the image-quality state value. For example, the image forming apparatus may determine first image-quality state information corresponding to a range including a current image-quality state value of the image forming apparatus based on the plurality of pieces of the image-quality state information. The image forming apparatus may detect information on the type of the first screen mapped with the first image-quality state information.

In operation 240, the image forming apparatus may perform a first image forming operation according to the type of the screen.

For example, the image forming apparatus may display information for inquiring whether to apply the identified type of the screen. When a command for applying the identified type of the screen is received, the image forming apparatus may perform the first image forming operation according to the identified type of the screen.

For example, when the identified type of the screen is a type of a screen corresponding to an LPI less than a preset LPI, the image forming apparatus may display guide information for improving image quality. For example, when an image-quality state is deteriorated due to aging of a component, the image forming apparatus may display information for guiding replacement of the component.

In an example, the image forming apparatus may identify the type of the screen based on information on an indoor environment in which the image forming apparatus operates. For example, the information on the indoor environment may include information on an indoor temperature at which the image forming apparatus operates and information on an indoor humidity at which the image forming apparatus operates. High temperature and high humidity may deteriorate the image-quality state of the printout produced by the image forming operation. Accordingly, when temperature and humidity are high, the image forming apparatus may identify a type of a screen by taking the temperature and the humidity into account.

For example, when the indoor temperature exceeds a reference temperature and the indoor humidity exceeds a reference humidity, the image forming apparatus may change a type of a first screen corresponding to a first LPI set in the image forming apparatus to a type of a second screen corresponding to a second LPI less than the first LPI. For example, the reference temperature may be 30 degrees, and the reference humidity may be 80%.

In addition, the image forming apparatus may identify the type of the screen based on information on a usage amount of a consumable within the image forming apparatus. For example, when a usage amount of a consumable exceeds a reference usage amount, the image forming apparatus may change a type of a first screen corresponding to a first LPI set in the image forming apparatus to a type of a second screen corresponding to a second LPI less than the first LPI.

Figure 3A:
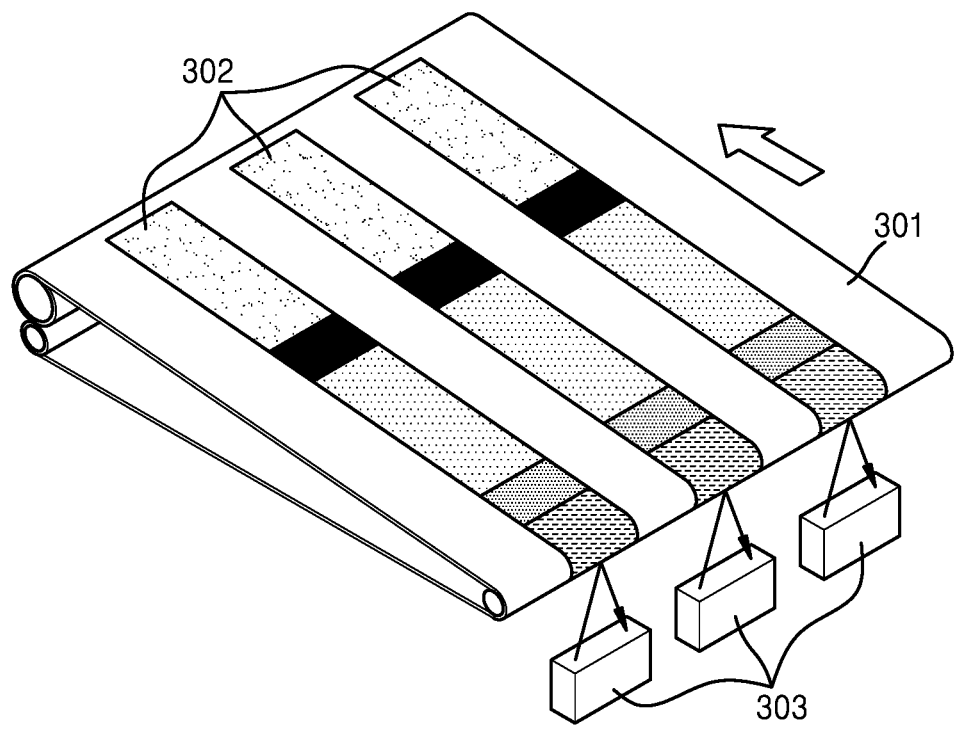
FIGS. 3A and 3B are diagrams for describing a process of obtaining a signal for a pattern by using a sensor, according to an example.
Figure 3B:
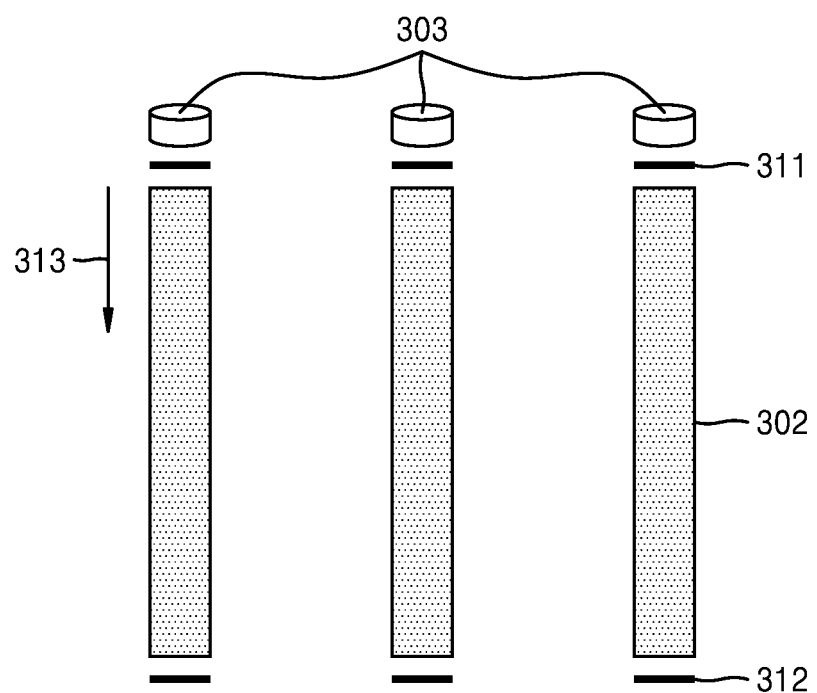

FIGS. 3A and 3B are diagrams for describing a process of obtaining a signal for a pattern by using the sensor, according to an example.

Referring to FIG. 3A, an image forming apparatus may form, on an image transfer belt 301, a test image with respect to a pattern 302 used for diagnosing an image-quality state of a printout output by the image forming apparatus.

For example, the image transfer belt 301 may be an intermediate transfer medium to which a toner image formed on a photoconductor of a developing device within the image forming apparatus is transferred. The developing device may include a photoconductor having an electrostatic latent image formed on a surface thereof and a developing roller that supplies a developer to the electrostatic latent image to develop into a visible toner image.

For example, the pattern 302 may have a width in a same direction as a scanning direction of an image forming operation and a length in a same direction as a processing direction of the image forming operation. For example, the scanning direction of the image forming operation may be a main scanning direction, and the processing direction of the image forming operation may be a sub-scanning direction.

For example, the image forming apparatus may include a sensor 303 for obtaining a test signal corresponding to the test image formed on the image transfer belt 301. For example, the sensor 303 may include a photo diode (PD) sensor.

For example, the width of each pattern 302 may be set so that the sensor 303 may detect the test signal. For example, the width of the pattern 302 may be about 12 mm. In addition, the length of each pattern 302 may be set based on a measurement margin and a multiple of a circumferential length of an OPC. For example, when the circumferential length of the OPC is 307 mm, and the measurement margin is 16.6 mm, the length of the pattern 302 may be set to 307 mm×2+16.6 mm=205 mm.

Referring to FIG. 3B, the sensor 303 may detect a test signal for the pattern 302 having a single density. For example, the sensor 303 may obtain a signal for the pattern 302 in a processing direction 313 of the image forming operation based on a front-end area marker 311 and a rear-end area marker 312.

Figure 4:
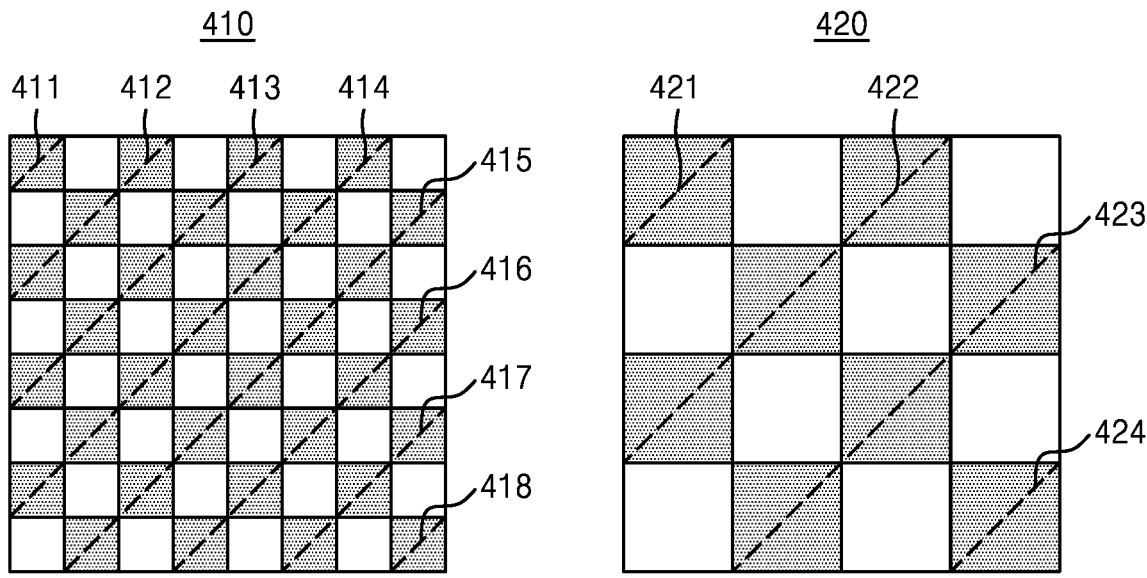
FIG. 4 is a diagram for describing lines per inch (LPI), according to an example.

FIG. 4 is a diagram for describing LPI, according to an example.

For example, the image forming apparatus may use a halftoning technique to express various gradation. Halftoning may refer to an operation of displaying an image with fine dots. The image forming apparatus may display contrast by adjusting a size of dots and adjust sharpness of a printout by adjusting a distance between the dots based on the halftoning technique.

Referring to an image 410 of FIG. 4, colored unit blocks may represent halftone dots. A size of the halftone dots and a distance between the halftone dots may affect quality of a printout. For example, the smaller the size of the halftone dots and the smaller the distance between the halftone dots, the clearer an image of the printout may be displayed.

For example, the type of the screen may correspond to halftone information indicating a resolution of the printout. For example, the halftone information may indicate arrangement information of halftone dots in the screen. In addition, the arrangement information may include information about a number of lines corresponding to the halftone dots per inch in the screen. In other words, the arrangement information of the halftone dots may include LPI information.

For example, LPI may vary according to a size of halftone dots and a distance between the halftone dots. For example, LPI may be calculated as a number of lines connecting centers of adjacent halftone dots per inch. For example, lines 411, 412, 413, 414, 415, 416, 417, and 418 shown in the image 410 of FIG. 4 are valid lines used to calculate LPI. In addition, lines 421, 422, 423, and 424 shown in an image 420 of FIG. 4 are valid lines used to calculate LPI. The LPI represents a number of lines that are included per inch in the screen.

For example, a size of halftone dots shown in the image 420 of FIG. 4 is twice as large as the size of the halftone dots shown in the image 410 of FIG. 4. In addition, a distance between the halftone dots shown in the image 420 of FIG. 4 is twice as long as the distance between the halftone dots shown in the image 410 of FIG. 4. The LPI calculated in the image 410 of FIG. 4 may be twice as large as the LPI calculated in the image 420 of FIG. 4. For example, the LPI calculated in the image 410 of FIG. 4 may be 212, and the LPI calculated in the image 420 of FIG. 4 may be 106.

In other words, the smaller a size of halftone dots and the smaller a distance between the halftone dots, LPI may increase. As the LPI increases, sharpness of a printout may be increased. When the sharpness of the printout is increased, a level of detail of an image in the printout may be increased. However, when a level of image quality of the printout is lowered due to a process deviation of a component of the image forming apparatus or aging of a component on account of use of the component, noise or jitter may appear on a printout generated according to a type of a screen having a high LPI. In contrast, because noise or jitter may not clearly appear on a printout generated according to a type of a screen having a low LPI, uniformity of the printout may be increased.

For example, it is assumed that a type of a screen corresponding to the LPI calculated in the image 410 of FIG. 4 is a type of a first screen, and it is assumed that a type of a screen corresponding to the LPI calculated in the image 420 of FIG. 4 is a type of a second screen.

For example, when an image-quality state indicating a resolution of a printout is deteriorated due to a process deviation of a component of the image forming apparatus or aging of a component on account of use of the component, noise or jitter may appear more on a printout on which a certain image is output according to the type of the first screen than on a printout on which a certain image is output according to the type of the second screen. Accordingly, when the image-quality state is deteriorated, the image forming apparatus may change a high LPI to a low LPI and may perform the image forming operation according to a type of a screen corresponding to the low LPI.

Figure 5:
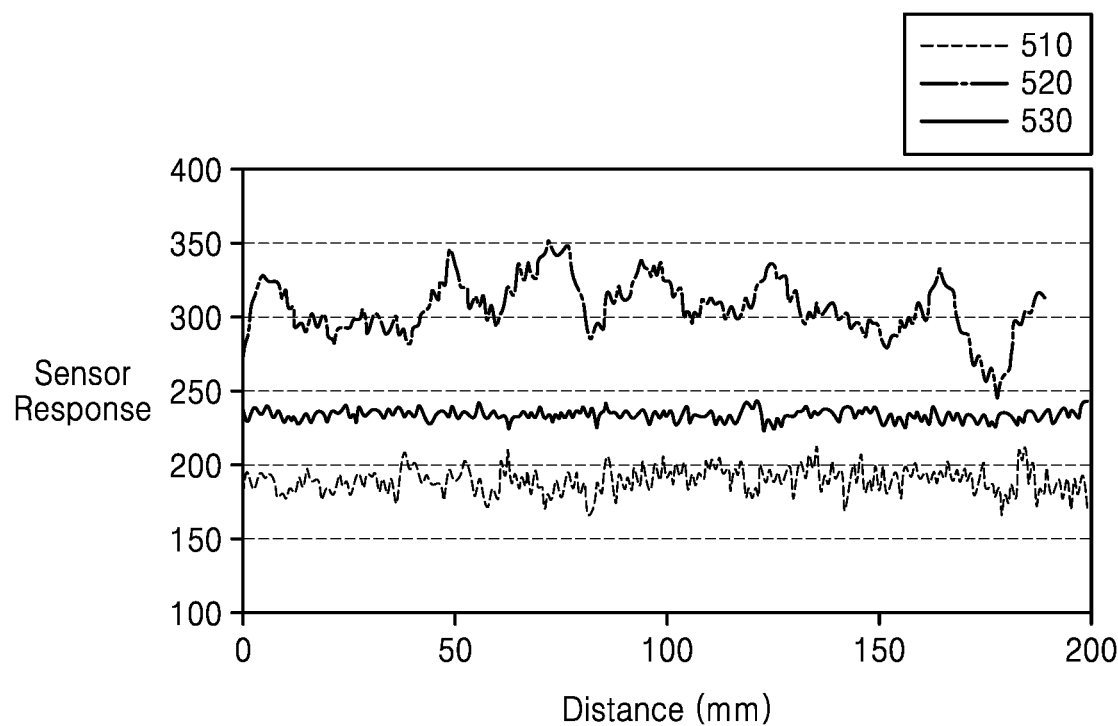
FIG. 5 is a graph illustrating an example of a test signal obtained by a sensor.

FIG. 5 is a graph illustrating an example of a test signal obtained by a sensor.

Referring to FIG. 5, an image forming apparatus may form, for example on an ITB, a test image with respect to a pattern used for diagnosing an image-quality state of a printout. For example, the pattern may be formed of a certain color and a single density and may have a length of about 200 mm. A sensor within the image forming apparatus may obtain a test signal corresponding to the pattern.

The graph of FIG. 5 illustrates three types of test signals obtained by the sensor. The three types of the test signals include a first test signal 510, a second test signal 520, and a third test signal 530. For example, each of the test signals 510, 520, and 530 may be a response to monitoring a signal of a certain pattern at a different period in order for the same image forming apparatus to diagnose an image-quality state of a test image. In another example, each of the test signals 510, 520, and 530 may be a response to monitoring a signal of a certain pattern in order for different image forming apparatuses to diagnose an image-quality state of a test image.

The third test signal 530 has a small change in a sensor response value according to a distance. It may be determined that an image-quality state of a test image with respect to the third test signal 530 is normal. In contrast, for each of the first test signal 510 and the second test signal 520, a change in a sensor response value according to a distance is greater than the change in the sensor response value of the third test signal 530. It may be determined that an image-quality state of a test image with respect to each of the first test signal 510 and the second test signal 520 is abnormal. In this case, a noise area or a jitter area may be detected in the test image. For example, in the noise area, the test image may not be clearly visible, may be blurred, or may appear hazy. In addition, in the noise area, a dot or a line, which is irrelevant to the test image, may be detected. For example, in the jitter area, a vertical line or a horizontal line may be detected.

For example, the image forming apparatus may obtain image-quality state information indicating an image-quality state of a test image, based on a value of a test signal, in order to diagnose the image-quality state of the test image.

For example, the image forming apparatus may obtain a standard deviation of the test signal as a first image-quality state value indicating the image-quality state of the test image. For example, the image forming apparatus may determine the first image-quality state value as a noise value.

For example, the image forming apparatus may obtain, as a second image-quality state value, a standard deviation calculated from a signal obtained by removing a low-frequency signal component from the test signal. In an example, the image forming apparatus may remove the low-frequency signal component from the test signal by using a filter that removes the low-frequency signal component. The image forming apparatus may obtain, as the second image-quality state value, the standard deviation of the preprocessed test signal. For example, the filter that removes the low-frequency signal component may be a moving average removal filter. For example, the image forming apparatus may determine the second image-quality state value as a noise value.

For example, the image forming apparatus may obtain, as a third image-quality state value, a standard deviation calculated from a signal obtained by removing the low-frequency signal component and a high-frequency signal component from the test signal. In an example, the image forming apparatus may remove the low-frequency signal component and the high-frequency signal component from the test signal, by using a band-path filter. The image forming apparatus may determine, as the third image-quality state value, the standard deviation of the preprocessed test signal.

Figure 6:
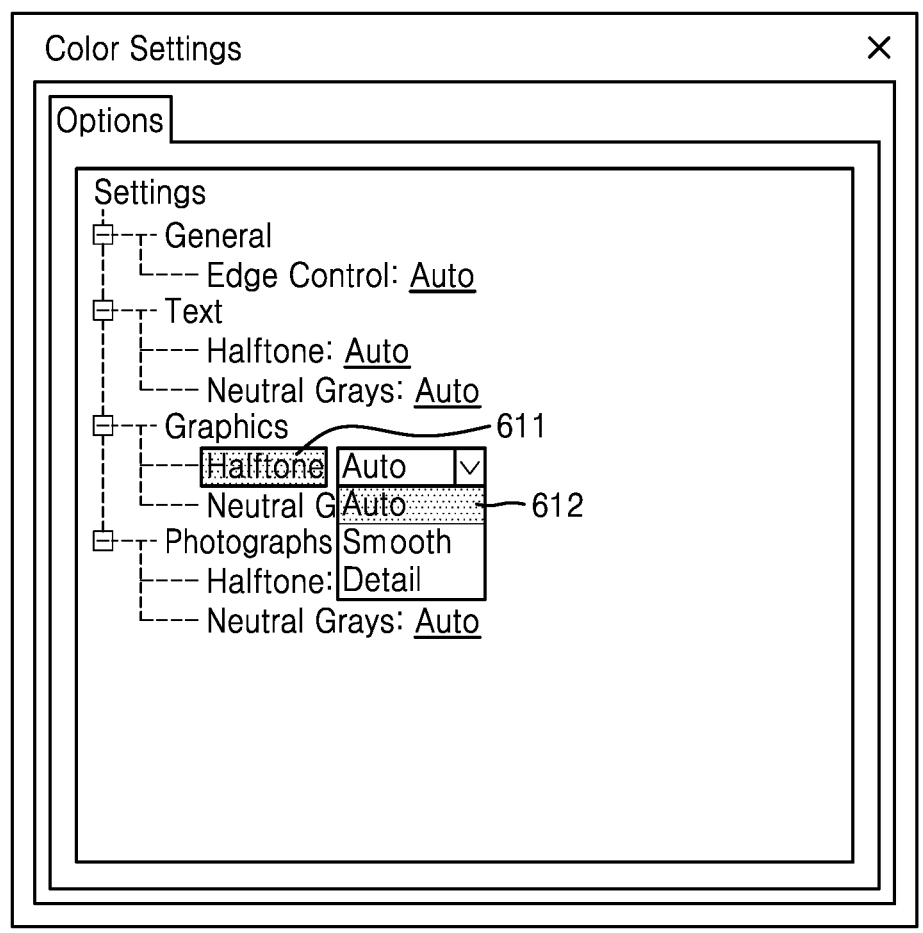
FIG. 6 is a diagram illustrating a screen for setting a criterion for identifying a type of a screen, according to an example.

FIG. 6 is a diagram illustrating a screen for setting a criterion for identifying a type of a screen, according to an example.

Referring to FIG. 6, in a state where there is a process deviation of a component of the image forming apparatus or aging of a component on account of use of the component, when an image forming operation is performed according to a type of a screen corresponding to an LPI set in the image forming apparatus, a printout may have an area including noise or jitter. However, when the LPI set in the image forming apparatus is changed to a low LPI, and the image forming operation is performed according to a type of a screen corresponding to the low LPI, the noise or the jitter may be reduced in the printout, and uniformity of the printout may be increased.

The image forming apparatus may provide an interface for setting criteria for identifying a type of a screen. A setting option 611 for halftone may include auto, smooth, and detail.

For example, when the setting option 611 for halftone is set to smooth, the image forming apparatus may perform an image forming operation according to a type of a screen corresponding to an LPI less than a basic LPI among a plurality of LPI. When the image forming operation is performed according to the type of the screen corresponding to a low LPI, noise or jitter appear less on the printout. However, sharpness of the printout may deteriorate.

For example, when the setting option 611 for halftone is set to detail, the image forming apparatus may perform an image forming operation according to a type of a screen corresponding to an LPI higher than the basic LPI among the plurality of LPI. When the image forming operation is performed according to the type of a screen corresponding to a high LPI, sharpness of the printout may be high. However, noise or jitter may be detected in the printout.

For example, when the setting option 611 for halftone is set to auto 612, the image forming apparatus may periodically monitor image-quality state information indicating an image-quality state of a test image. As a result of the monitoring, when the image-quality state does not satisfy a reference image-quality condition, the image forming apparatus may change a set LPI to a low LPI and may perform an image forming operation according to a type of a screen corresponding to the changed LPI. In contrast, as a result of the monitoring, when the image-quality state satisfies the reference image-quality condition, the image forming apparatus may perform an image forming operation according to a type of a screen corresponding to a set LPI.

In addition, even in a case of being set to a low LPI, when a consumable within the image forming apparatus is replaced with a new consumable, the image forming apparatus may change the low LPI to a high LPI and may perform an image forming operation according to a type of a screen corresponding to the changed LPI.

In addition, when an indoor temperature and an indoor humidity, at which the image forming apparatus operates, exceed a reference temperature and a reference humidity, the image forming apparatus may change a set LPI to a low LPI and may perform an image forming operation according to a type of a screen corresponding to the changed LPI.

In other words, when the setting option 611 for halftone is set to auto 612, the image forming apparatus may periodically monitor image-quality state information and may determine an LPI based on a result of the monitoring. The image forming apparatus may perform an image forming operation according to a type of a screen corresponding to the determined LPI.

Figure 7A:
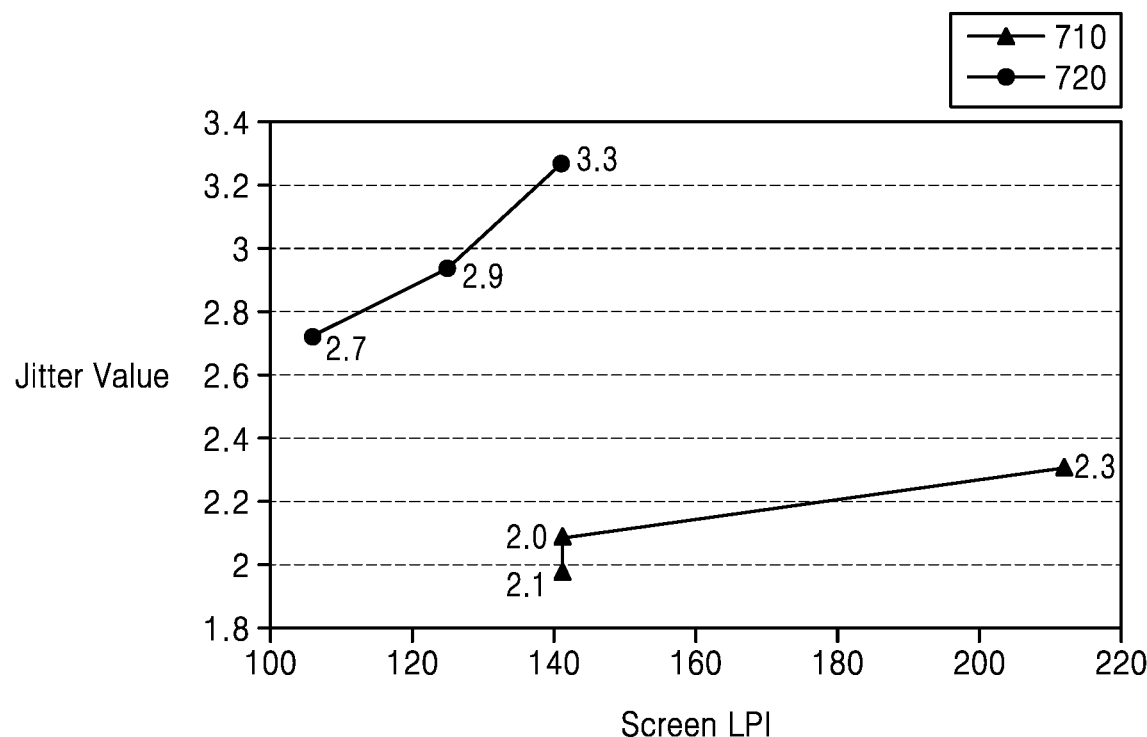
FIG. 7A is a graph for describing a relationship between an LPI value and a jitter value indicating an image-quality state, according to an example.

FIG. 7A is a graph for describing a relationship between an LPI value and a jitter value indicating an image-quality state, according to an example.

Referring to FIG. 7A, a first graph 710 represents a jitter value according to a type of a screen with respect to an LPI in a first image forming apparatus. In addition, a second graph 720 represents a jitter value according to a type of a screen with respect to an LPI in a second image forming apparatus.

As shown in FIG. 7A, an x-axis of the graph represents a value of screen LPI, and a y-axis of the graph represents a jitter value. Referring to the first graph 710 and the second graph 720, a jitter value decreases as an LPI decreases.

In addition, a reduction ratio of the jitter value according to reduction of the LPI in the first graph 710 is greater than a reduction ratio of the jitter value according to reduction of the LPI in the second graph 720. Accordingly, when the first image forming apparatus and the second image forming apparatus perform an image forming operation by changing an LPI to a lower level as an image-quality state deteriorates, an effect of increasing uniformity of a printout in the first image forming apparatus may be better than when done in the second image forming apparatus.

Figure 7B:
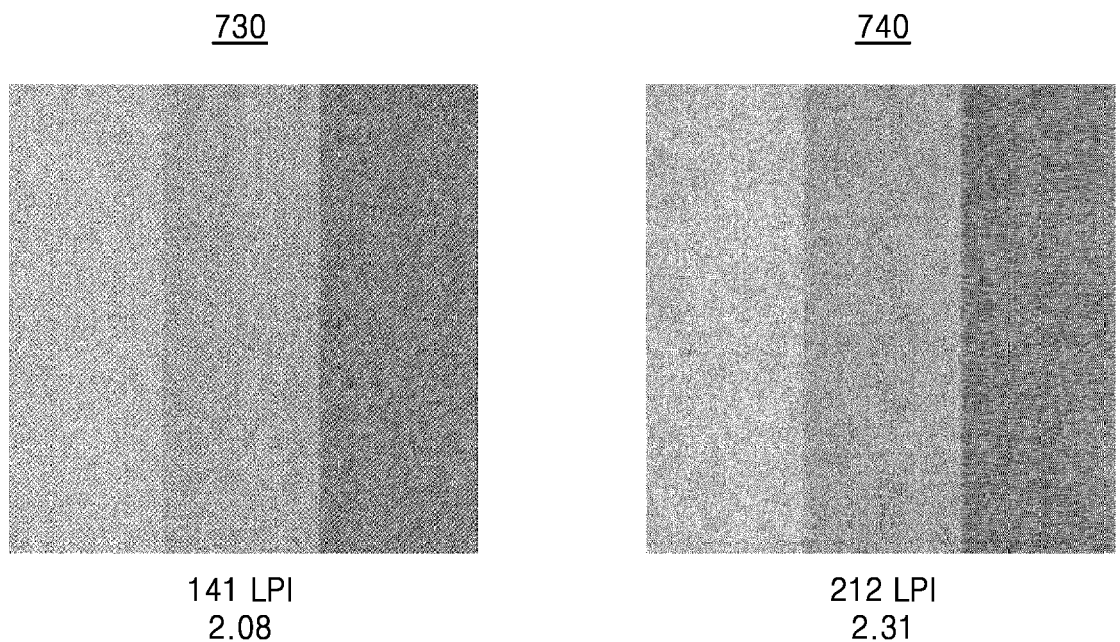
FIG. 7B is a diagram for describing an image-quality state according to LPI, according to an example.

FIG. 7B is a diagram for describing an image-quality state according to LPI, according to an example.

With reference to the second image forming apparatus described in FIG. 7A, an image 730 of FIG. 7B represents a test image formed in a case when an LPI is set to 141. In this case, a jitter value may be 2.08.

With reference to the second image forming apparatus described in FIG. 7A, an image 740 of FIG. 7B represents a test image formed in a case when an LPI is set to 212. In this case, a jitter value may be 2.31.

When the image 730 and the image 740 are compared, jitter may appear less in the image 730 than in the image 740. In addition, because sharpness of the image 740 is higher than that of the image 730, jitter may be more easily seen in the image 740.

Accordingly, when a jitter value for a printout generated by the image forming apparatus exceeds a reference jitter value, the image forming apparatus may change a set LPI to a low LPI and may perform the image forming operation according to a type of a screen with respect to the changed LPI.

Figure 8A:
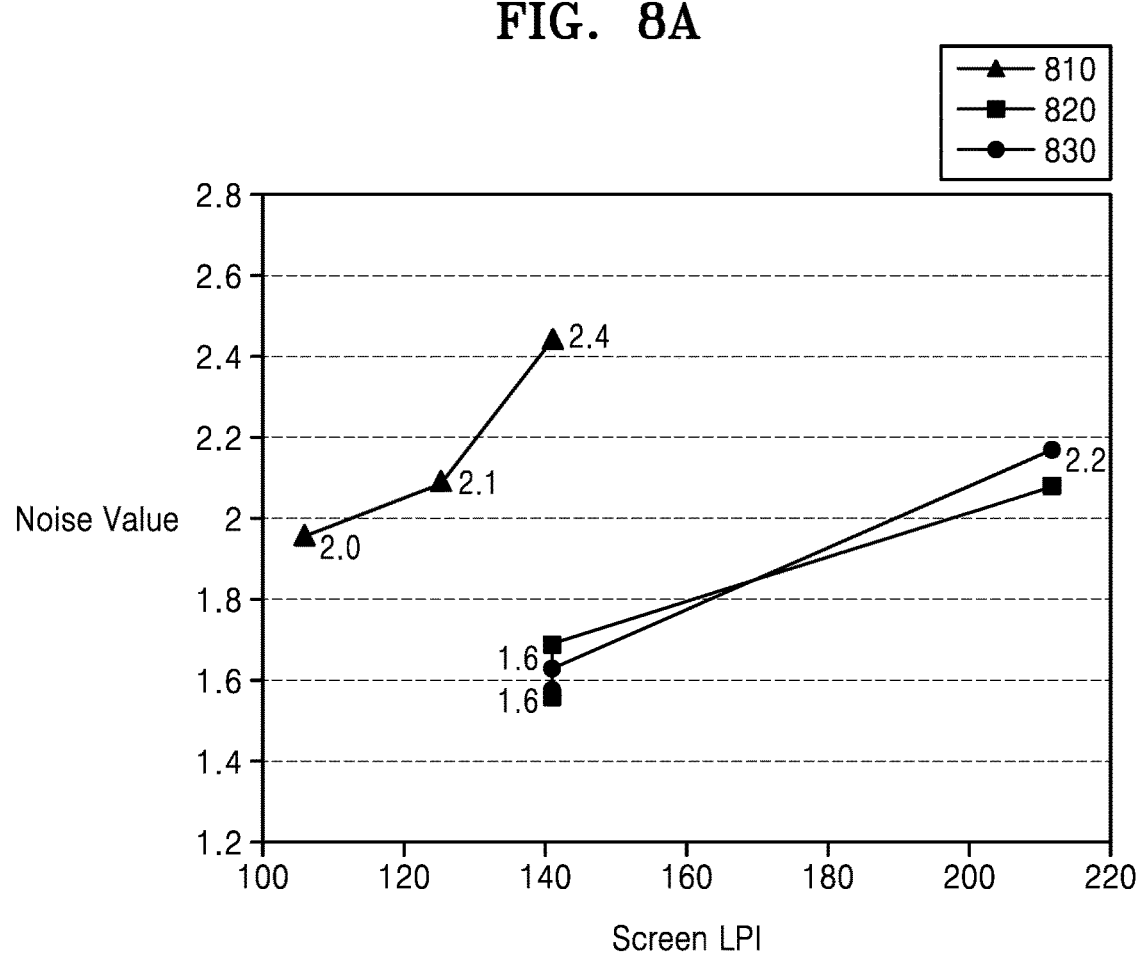
FIG. 8A is a graph for describing a relationship between an LPI value and a noise value indicating an image-quality state, according to an example.

FIG. 8A is a graph for describing a relationship between an LPI value and a noise value indicating an image-quality state, according to an example.

Referring to FIG. 8A, a first graph 810 represents a noise value according to a type of a screen with respect to an LPI in the first image forming apparatus. In addition, a second graph 820 represents a noise value according to a type of a screen with respect to an LPI in the second image forming apparatus. A third graph 830 represents a noise value according to a type of a screen with respect to an LPI in a third image forming apparatus.

As shown in FIG. 8A, an x-axis of the graph represents a value of screen LPI, and a y-axis of the graph represents a noise value. Referring to the first graph 810, the second graph 820, and the third graph 830, a noise value decreases as an LPI decreases.

In addition, a reduction ratio of the noise value according to reduction of the LPI in the first graph 810 is greater than a reduction ratio of the noise value according to reduction of the LPI in the second graph 820 and the third graph 830. Accordingly, when the first image forming apparatus, the second image forming apparatus, and the third image forming apparatus perform an image forming operation by changing an LPI to a lower level as an image-quality state deteriorates, an effect of increasing uniformity of a printout in the first image forming apparatus may be better than when done in the second image forming apparatus and the third image forming apparatus.

Figure 8B:
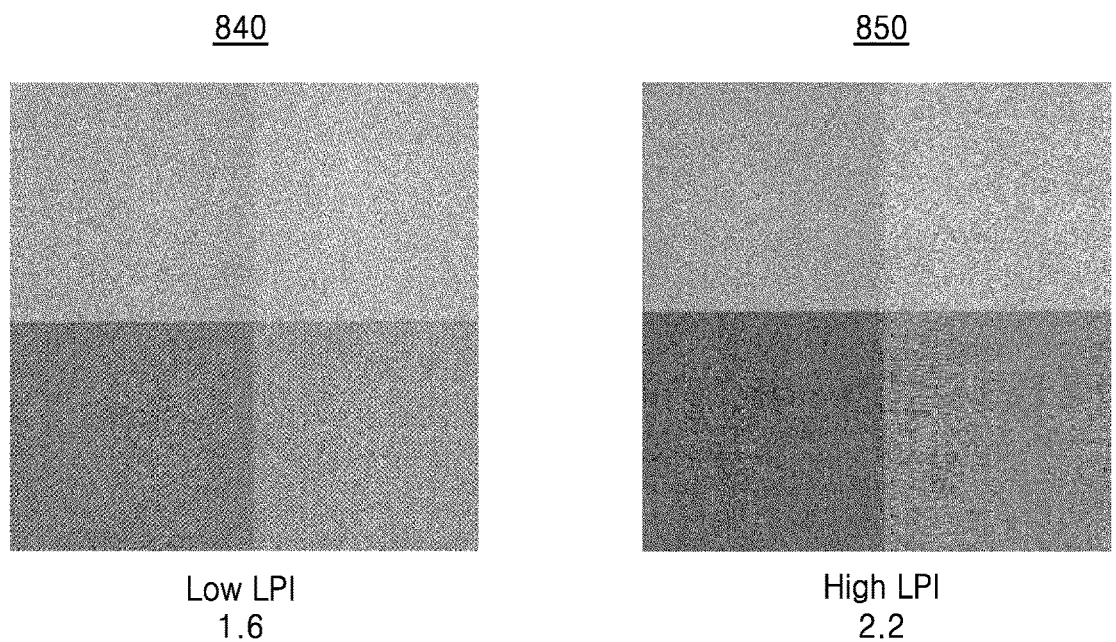
FIG. 8B is a diagram for describing an image-quality state according to LPI, according to an example.

FIG. 8B is a diagram for describing an image-quality state according to LPI, according to an example.

With reference to the second image forming apparatus described in FIG. 8A, an image 840 of FIG. 8B represents a test image formed in a case when an LPI is set to a low LPI (for example, the LPI is 141). In this case, a noise value may be 1.6.

With reference to the second image forming apparatus described in FIG. 8A, an image 850 of FIG. 8B represents a test image formed in a case when an LPI is set to a high LPI (for example, the LPI is 212). In this case, a noise value may be 2.2.

FIG. 9 is a flowchart illustrating a method of an image forming apparatus that monitors information of the image forming apparatus based on condition information for changing the type of the screen and changes a type of a screen according to a result of the monitoring, according to an example.

Referring to FIG. 9, the image forming apparatus may obtain condition information for changing a type of a screen based on image-quality state information, information on an indoor environment, or information on a usage amount of a consumable within the image forming apparatus in operation 910.

In an example, the image-quality state information may be information indicating an image-quality state of a printout output by the image forming apparatus. In addition, the information on the indoor environment may be information on temperature and humidity of an environment in which the image forming apparatus operates.

For example, the type of the screen may correspond to halftone information indicating a resolution of the printout.

In operation 920, the image forming apparatus may monitor information of the image forming apparatus, which corresponds to a condition within the condition information.

In operation 930, the image forming apparatus may change the type of the screen of the image forming apparatus when first information of the image forming apparatus, which satisfies a first condition, is detected according to the monitoring.

Figure 10:
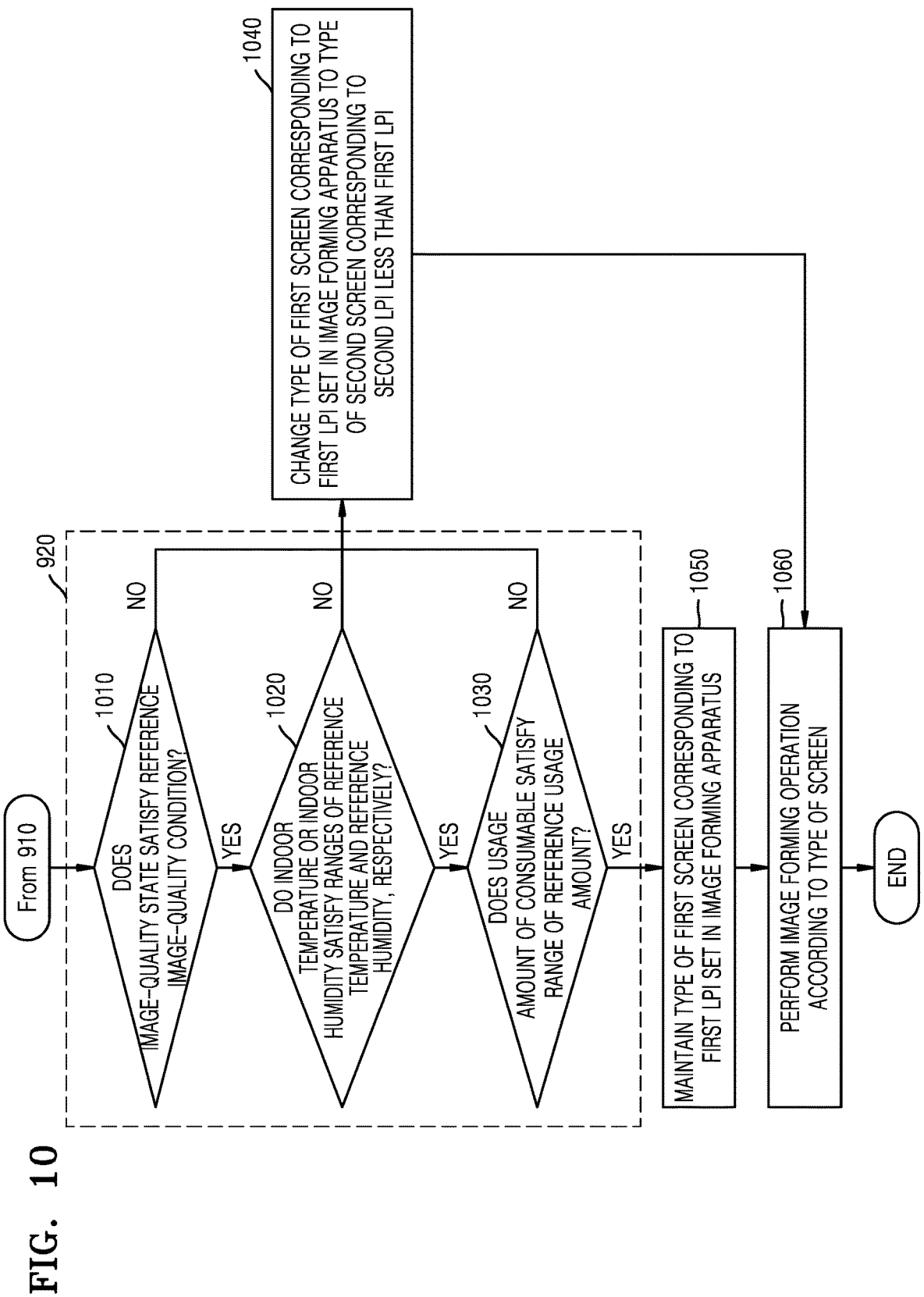
FIG. 10 is a flowchart illustrating a method of an image forming apparatus that changes a type of a screen according to a result of monitoring, according to an example.

FIG. 10 is a flowchart illustrating a method of an image forming apparatus that changes a type of a screen according to a result of monitoring, according to an example.

Referring to FIG. 10, the image forming apparatus may obtain image-quality state information indicating an image-quality state of a printout output by the image forming apparatus. The image forming apparatus may determine whether the image-quality state according to the image-quality state information satisfies a reference image-quality condition in operation 1010.

For example, when an image-quality state value exceeds a preset reference image-quality state value, the image forming apparatus may determine that the image-quality state is deteriorated and may perform operation 1040. In contrast, when the image-quality state value does not exceed the preset reference image-quality state value, the image forming apparatus may determine that the image-quality state is maintained the same as the existing image-quality state and may perform operation 1020.

In operation 1020, the image forming apparatus may obtain information on an indoor environment in which the image forming apparatus operates. For example, the information on the indoor environment may be information on an indoor temperature at which the image forming apparatus operates and information on an indoor humidity at which the image forming apparatus operates. The image forming apparatus may identify whether the indoor temperature and the indoor humidity satisfy ranges of a reference temperature and a reference humidity.

For example, when the indoor temperature exceeds the reference temperature and the indoor humidity exceeds the reference humidity, the image forming apparatus may determine an indoor environment as a factor that may deteriorate quality of an image forming operation and may perform operation 1040. In addition, even when the indoor temperature exceeds the reference temperature, or the indoor humidity exceeds the reference humidity, the image forming apparatus may perform operation 1040. In contrast, when the indoor temperature is less than or equal to the reference temperature and the indoor humidity is less than or equal to the reference humidity, the image forming apparatus may determine that the image-quality state is maintained the same as the existing image-quality state and may perform operation 1030.

In operation 1030, the image forming apparatus may obtain information on a usage amount of a consumable within the image forming apparatus. For example, when a consumable is an OPC, information on a usage amount of the consumable may be a number of revolutions of the OPC. The image forming apparatus may identify whether the usage amount of the consumable satisfies a range of a reference usage amount.

For example, when the usage amount of the consumable exceeds the range of the reference usage amount, the image forming apparatus may determine the consumable as a factor that may deteriorate a quality of the image forming operation and may perform operation 1040. For example, when a reference number of revolutions of the OPC is 120,000,000, and a number of the revolutions of the OPC exceeds the reference number of the revolutions, the image forming apparatus may change an LPI to a low LPI. In contrast, when the usage amount of the consumable does not exceed the range of the reference usage amount, the image forming apparatus may determine that the image-quality state is maintained the same as the existing image-quality state and may perform operation 1050.

In operation 1040, the image forming apparatus may change a type of a first screen corresponding to a first LPI set in the image forming apparatus to a type of a second screen corresponding to a second LPI less than the first LPI. For example, when the first LPI set in the image forming apparatus is 212, the image forming apparatus may set the second LPI to 141 or 106.

For example, according to a degree to which an image-quality state value exceeds a reference image-quality state value, the image forming apparatus may determine a value of LPI to be changed. As an example, when a noise value exceeds a reference noise value and is within twice the reference noise value, the image forming apparatus may determine the second LPI as 141. When the noise value exceeds twice the reference noise value, the image forming apparatus may determine the second LPI as 106.

When it is determined that the image-quality state is maintained the same as the existing image-quality state, the image forming apparatus may maintain the type of the first screen corresponding to the first LPI set in the image forming apparatus, according to operation 1050.

In operation 1060, the image forming apparatus may perform the image forming operation according to the type of the screen corresponding to the set LPI.

Figure 11:
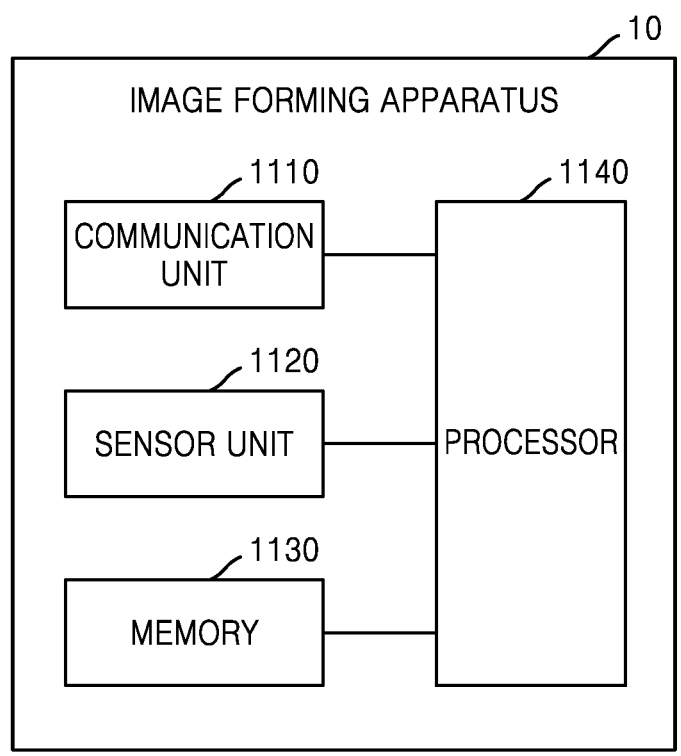
FIG. 11 is a block diagram of an image forming apparatus, according to an example.

FIG. 11 is a block diagram illustrating a configuration of an image forming apparatus, according to an example.

Referring to FIG. 11, an image forming apparatus 10 may include a communication unit 1110, a sensor unit 1120, a memory 1130, and a processor 1140. The illustrated components are not all essential components. The image forming apparatus 10 may be embodied with more components than the illustrated components, or the image forming apparatus 10 may be embodied with fewer components than the illustrated components. Hereinafter, examples of the components will be described.

The communication unit 1110 may perform communication with an external apparatus. In an example, the communication unit 1110 may be connected to a network by wire or wirelessly to perform communication with the external apparatus. Here, the external apparatus may be an electronic apparatus of a user using the image forming apparatus 10, a server that manages the image forming apparatus 10, or the like. In an example, the communication unit 1110 may be a transceiver.

The sensor unit 1120 may detect a pattern transferred onto the ITB. For example, the sensor unit 1120 may include a photo sensor. The photo sensor may be provided in a multiple number. For example, the sensor unit 1120 may be positioned so as to face the same line in a main scanning direction of the ITB, and detect a pattern of a corresponding position on the same line in the main scanning direction of the ITB.

In addition, the sensor unit 1120 may include a temperature sensor to detect an indoor (e.g., ambient) temperature at which the image forming apparatus 10 operates or a humidity sensor to detect an indoor (e.g., ambient) humidity at which the image forming apparatus 10 operates. In addition, the sensor unit 1120 may include a sensor to check and record a usage amount of a component within the image forming apparatus 10.

The memory 1130 may store software or a program. For example, the memory 1130 may store a program related to an example operation of the image forming apparatus 10 described in FIGS. 1 to 10.

The processor 1140 may execute a program stored in the memory 1130, read data or a file stored in the memory 1130, and store a new file in the memory 1130. The processor 1140 may execute instructions stored in the memory 1130.

The processor 1140 may form a test image with respect to a pattern used for diagnosing an image-quality state of a printout output by the image forming apparatus 10. For example, the pattern may indicate a single density for a certain color and may have a certain width and a certain length.

For example, the processor 1140 may set a period based on a reference number of pages for printing the printout output by the image forming apparatus 10 or a reference usage amount of a consumable within the image forming apparatus 10. The processor 1140 may form a test image with respect to a pattern on the ITB according to the period.

The processor 1140 may obtain image-quality state information indicating an image-quality state of the test image based on a test signal corresponding to the test image, which is obtained via the sensor unit 1120 within the image forming apparatus 10.

For example, the image-quality state of the test image may represent a state with respect to gradation, color balance, color reproducibility, contrast, sharpness, or the like, which are expressed in the test image. The image-quality state of the test image may be deteriorated as more noise or jitter is included in the test image. Accordingly, the image-quality state of the test image may be determined by a degree to which noise or jitter is included in the test image. The image-quality state information may include numerical information indicating a degree to which noise or jitter is included in the test image.

For example, the processor 1140 may calculate a first standard deviation of the test signal. The processor 1140 may obtain the first standard deviation as a first image-quality state value indicating the image-quality state of the test image.

For example, the processor 1140 may obtain a signal obtained by removing a low-frequency signal component from the test signal. The processor 1140 may calculate a second standard deviation with respect to the signal obtained by removing the low-frequency signal component from the test signal. The processor 1140 may obtain the second standard deviation as a second image-quality state value indicating the image-quality state of the test image.

For example, the processor 1140 may obtain a signal obtained by removing the low-frequency signal component and a high-frequency signal component from the test signal. The processor 1140 may calculate a third standard deviation with respect to the signal obtained by removing the low-frequency signal component and the high-frequency signal component from the test signal. The processor 1140 may obtain the third standard deviation as a third image-quality state value indicating the image-quality state of the test image.

The processor 1140 may identify a type of a screen which corresponds to halftone information indicating a resolution of the printout based on the image-quality state information.

For example, the halftone information may indicate arrangement information of halftone dots in the screen. For example, the arrangement information may include information about a number of lines corresponding to the halftone dots per inch in the screen.

For example, when a first image-quality state corresponding to the image-quality state information does not satisfy a reference image-quality condition, the processor 1140 may change a type of a first screen corresponding to a first LPI set in the image forming apparatus 10 to a type of a second screen corresponding to a second LPI less than the first LPI. For example, the first LPI may be 212, and the second LPI may be 141.

For example, a reference image-quality value within the reference image-quality condition may be a threshold value for changing a type of a screen. For example, when a first reference image-quality value is set to 3, and a first image-quality state value is obtained as 3.2, the processor 1140 may change a high LPI to a low LPI. In other words, the processor 1140 may identify a type of a screen as a type of a screen corresponding to an LPI less than an LPI set in the image forming apparatus 10.

In addition, when a second reference image-quality value is set to 6, and a second image-quality state value, which is obtained after the first image-quality state value, is obtained as 6.1, the processor 1140 may change the low LPI to a very low LPI. For example, the high LPI may be 212, the low LPI may be 141, and the very low LPI may be 106.

In addition, a number of times an image-quality state value exceeds a reference image-quality state value may also be a factor for changing a type of a screen. For example, when the number of times the image-quality state value exceeds the reference image-quality state value is 5 or more, the processor 1140 may change a high LPI to a low LPI. In other words, the processor 1140 may identify a type of a screen as a type of a screen corresponding to an LPI less than an LPI set in the image forming apparatus 10.

For example, when a first consumable within the image forming apparatus 10 is replaced, the processor 1140 may change the type of the second screen to the type of the first screen. Here, information on a usage amount of the first consumable may be used to determine a first image-quality state. In an example, when the first consumable is replaced with a new consumable, the processor 1140 may determine that the image-quality state is improved in comparison with the previous image-quality state, and may change a low LPI to a high LPI. In other words, the processor 1140 may change a type of a screen to the type of the first screen corresponding to the first LPI greater than the second LPI set before the first consumable is replaced.

In addition, the processor 1140 may map a plurality of pieces of image-quality state information with information on a type of a screen corresponding to the plurality of pieces of image-quality state information and store a mapping result in the memory 1130. Here, the information on the type of the screen corresponding to the image-quality state information may be information on the type of the screen to be applied according to a range of the image-quality state value. For example, the processor 1140 may determine first image-quality state information corresponding to a range including a current image-quality state value of the image forming apparatus 10 based on the plurality of pieces of the image-quality state information. The processor 1140 may detect information on the type of the first screen mapped with the first image-quality state information.

The processor 1140 may perform a first image forming operation according to a type of a screen.

For example, the processor 1140 may display, on a user interface apparatus within the image forming apparatus 10, information for inquiring whether to apply the identified type of the screen. When a command for applying the identified type of the screen is received, the processor 1140 may perform the first image forming operation according to the determined type of the screen.

For example, when the identified type of the screen is a type of a screen corresponding to an LPI less than a preset LPI, the user interface apparatus within the image forming apparatus 10 may display guide information for improving image quality. For example, when an image-quality state is deteriorated due to aging of a component, the user interface apparatus may display information for guiding replacement of the component.

In an example, the processor 1140 may identify the type of the screen based on information on an indoor environment in which the image forming apparatus 10 operates. For example, the information on the indoor environment may include information on an indoor temperature at which the image forming apparatus 10 operates and information on an indoor humidity at which the image forming apparatus 10 operates. High temperature and high humidity may deteriorate the image-quality state of the printout produced by the image forming operation. Accordingly, when temperature and humidity are high, the processor 1140 may identify a type of a screen by taking the temperature and the humidity into account.

For example, when the indoor temperature exceeds a reference temperature or the indoor humidity exceeds a reference humidity, the processor 1140 may change a type of a first screen corresponding to a first LPI set in the image forming apparatus 10 to a type of a second screen corresponding to a second LPI less than the first LPI. For example, the reference temperature may be 30 degrees, and the reference humidity may be 80%.

In addition, the processor 1140 may identify the type of the screen based on information on a usage amount of a consumable within the image forming apparatus 10. For example, when a usage amount of a consumable exceeds a reference usage amount, the processor 1140 may change a type of a first screen corresponding to a first LPI set in the image forming apparatus 10 to a type of a second screen corresponding to a second LPI less than the first LPI.

In addition, the processor 1140 may obtain condition information for changing a type of a screen based on image-quality state information, information on an indoor environment, or information on a usage amount of a consumable within the image forming apparatus 10.

In an example, the image-quality state information may be information indicating an image-quality state of a printout output by the image forming apparatus 10. In addition, the information on the indoor environment may be information on temperature or humidity of an environment in which the image forming apparatus 10 operates. For example, the type of the screen may correspond to halftone information indicating a resolution of the printout.

The processor 1140 may monitor information of the image forming apparatus 10, which corresponds to a condition within the condition information. The processor 1140 may change a type of a screen of the image forming apparatus 10 when first information of the image forming apparatus 10, which satisfies a first condition, is detected according to the monitoring.

For example, when an image-quality state exceeds a preset reference image-quality state value, the image forming apparatus 10 may determine that an image-quality state is deteriorated and may change a type of a screen corresponding to a high LPI to a type of a screen corresponding to a low LPI. In contrast, when the image-quality state value does not exceed the preset reference image-quality state value, the processor 1140 may determine that the image-quality state is maintained the same as the existing image-quality state and may maintain the type of the screen.

For example, when an indoor (e.g., ambient) temperature exceeds a reference temperature or an indoor (e.g., ambient)

humidity exceeds a reference humidity, the processor 1140 may determine an indoor environment as a factor that may deteriorate a quality of the image forming operation and may change a type of a screen corresponding to a high LPI to a type of a screen corresponding to a low LPI. When the indoor temperature is less than or equal to the reference temperature and the indoor humidity is less than or equal to the reference temperature, the processor 1140 may determine that the image-quality state is maintained the same as the existing image-quality state and may maintain the type of the screen.

For example, when a usage amount of a consumable exceeds a range of a reference usage amount, the processor 1140 may determine the consumable as a factor that may deteriorate quality of the image forming operation and may change a type of a screen corresponding to a high LPI to a type of a screen corresponding to a low LPI. In contrast, when the usage amount of the consumable does not exceed the range of the reference usage amount, the image forming apparatus 10 may determine that the image-quality state is maintained the same as the existing image-quality state and may maintain the type of the screen.

Figure 12:
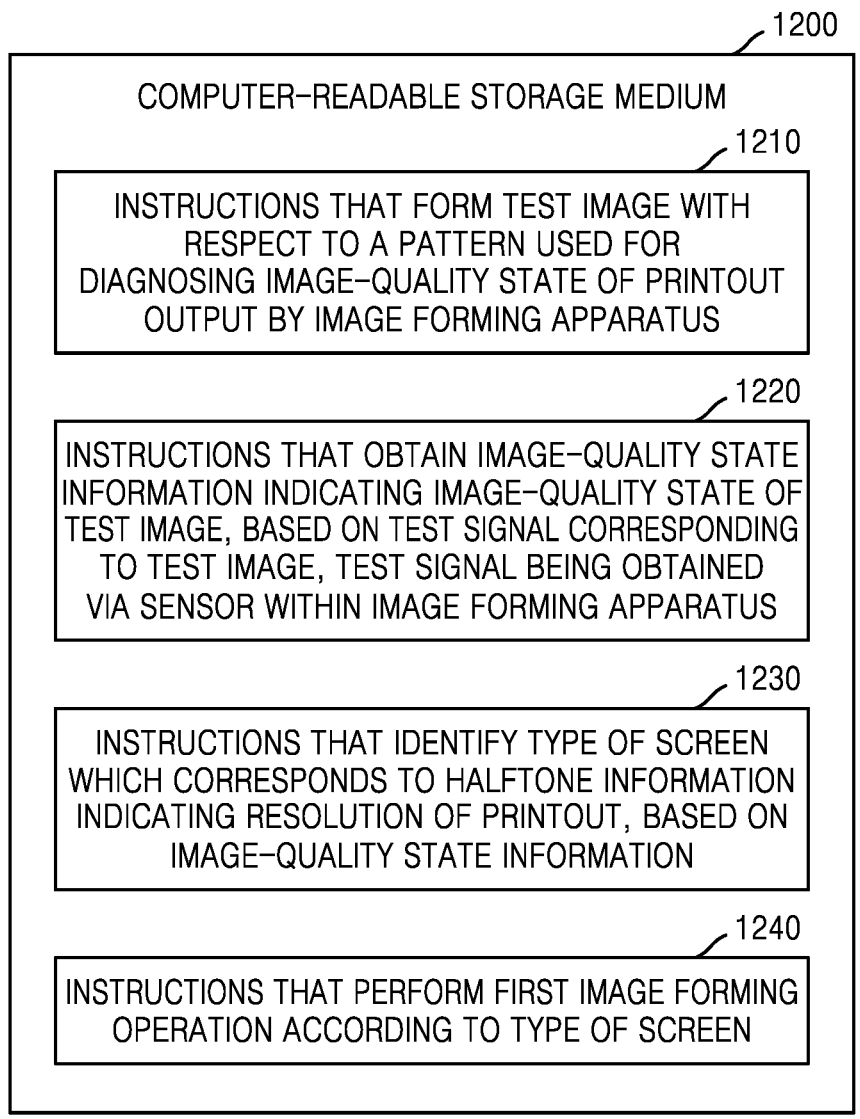
FIG. 12 is a diagram for describing instructions stored in a computer-readable storage medium, according to an example.

FIG. 12 is a diagram for describing instructions stored in a computer-readable storage medium 1200, according to an example.

Referring to FIG. 12, the computer-readable storage medium 1200 may store instructions related to an example operation of an image forming apparatus described in FIGS. 1 to 10. For example, the computer-readable storage medium 1200 may store instructions 1210 that form a test image with respect to a pattern used for diagnosing an image-quality state of a printout output by an image forming apparatus, instructions 1220 that obtain image-quality state information indicating an image-quality state of the test image, based on a test signal corresponding to the test image, which is obtained via a sensor within the image forming apparatus, instructions 1230 that identify a type of a screen which corresponds to halftone information indicating a resolution of the printout based on the image-quality state information, and instructions 1240 that perform a first image forming operation according to the type of the screen.

In addition, the computer-readable storage medium 1200 may store instructions that obtain condition information for changing the type of the screen based on the image-quality state information, information on an indoor environment, or information on a usage amount of a consumable, instructions that monitor information of the image forming apparatus corresponding to a condition within the condition information, and instructions that change the type of the screen of the image forming apparatus when first information of the image forming apparatus, which satisfies a first condition, is detected according to the monitoring.

The example operation methods of an image forming apparatus described above may be embodied in the form of a non-transitory computer-readable storage medium that stores data or instructions executable by a computer or a processor. The example operation methods may be written using a program that may be executed in a computer, and may be embodied in a general-purpose digital computer that operates the program by using a non-transitory computer-readable storage medium. The non-transitory computer-readable storage medium may include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, an optical data storage device, a hard disk, a solid-state disk (SSD), and store instructions or software, associated data, data files, and data structures, and may be any type of device capable of providing instructions or software, related data, data files, and data structures to a processor or computer so that the processor and the computer may execute the instructions.

It should be understood that examples described herein should be considered in a descriptive sense and not for purposes of limitation. Descriptions of features or aspects within each example should typically be considered as available for other similar features or aspects in other examples. While examples have been described with reference to the figures, it will be understood by those of ordinary skill in the art that various changes in form and details may be made therein without departing from the spirit and scope as defined by the following claims.

What is claimed is:

1. An operation method of an image forming apparatus, the operation method comprising:
    forming a test image with respect to a pattern used for diagnosing an image-quality state of a printout output by the image forming apparatus;
    obtaining a test signal for the pattern corresponding to the test image via a sensor of the image forming apparatus;
    obtaining image-quality state information indicating an image-quality state of the test image based on the test signal;
    identifying a type of a screen corresponding to halftone information indicating a resolution of the printout based on the image-quality state information; and
    performing a first image forming operation according to the type of the screen.

2. The operation method of claim 1, wherein the obtaining of the image-quality state information indicating the image-quality state of the test image based on the test signal comprises:
    obtaining a standard deviation of the test signal as a first image-quality state value indicating the image-quality state of the test image;
    obtaining, as a second image-quality state value, a standard deviation calculated from a signal obtained by removing a low-frequency signal component from the test signal; or
    obtaining, as a third image-quality state value, a standard deviation calculated from a signal obtained by removing the low-frequency signal component and a high-frequency signal component from the test signal.

3. The operation method of claim 1, wherein the forming of the test image with respect to the pattern comprises forming the test image on an image transfer belt according to a period set based on a reference number of pages for printing the printout output by the image forming apparatus or a reference usage amount of a consumable within the image forming apparatus.

4. The operation method of claim 1,
    wherein the halftone information indicates arrangement information of halftone dots in the screen, and
    wherein the arrangement information includes information about a number of lines corresponding to the halftone dots per inch in the screen.

5. The operation method of claim 1, wherein the identifying of the type of the screen based on the image-quality state information comprises, in a case where a first image-quality state corresponding to the image-quality state information does not satisfy a reference image-quality condition, changing a type of a first screen corresponding to a first lines per inch (LPI) set in the image forming apparatus to a type of a second screen corresponding to a second LPI less than the first LPI.

6. The operation method of claim 5, further comprising:
in a case where a first consumable of the image forming apparatus is replaced, changing the type of the second screen to the type of the first screen; and
performing a second image forming operation according to the type of the first screen.

7. The operation method of claim 1, further comprising identifying the type of the screen based on information regarding an environment in which the image forming apparatus operates.

8. The operation method of claim 7,
wherein the information regarding the environment includes information on a temperature at which the image forming apparatus operates or information on a humidity at which the image forming apparatus operates, and
wherein the operation method further comprises, in a case where the temperature exceeds a reference temperature or an indoor humidity exceeds a reference humidity, changing a type of a first screen corresponding to a first lines per inch (LPI) set in the image forming apparatus to a type of a second screen corresponding to a second LPI less than the first LPI.

9. The operation method of claim 1, further comprising:
mapping a plurality of pieces of image-quality state information and information on a type of a screen corresponding to the plurality of pieces of image-quality state information; and
storing a mapping result,
wherein the identifying of the type of the screen based on the image-quality state information, comprises:
determining first image-quality state information corresponding to the image-quality state information within the plurality of pieces of image-quality state information; and
detecting information on a type of a first screen mapped with the first image-quality state information.

10. The operation method of claim 1, further comprising:
displaying information for inquiring whether to apply the identified type of the screen; or
in a case where the identified type of the screen is a type of a screen corresponding to a lines per inch (LPI) less than a preset LPI, displaying guide information for improving image quality.

11. A non-transitory computer-readable storage medium to store instructions executable by a processor, the computer-readable storage medium comprising:
instructions for forming a test image with respect to a pattern used for diagnosing an image-quality state of a printout output by an image forming apparatus;
instructions for obtaining a test signal for the pattern corresponding to the test image via a sensor of the image forming apparatus;
instructions for obtaining image-quality state information indicating an image-quality state of the test image based on the test signal;
instructions for identifying a type of a screen corresponding to halftone information indicating a resolution of the printout based on the image-quality state information; and
instructions for performing a first image forming operation according to the type of the screen.

12. An image forming apparatus comprising:
a communication unit;
a sensor unit;
a processor; and
a memory to store instructions executable by the processor,
wherein the processor, by executing the instructions, is to:
form, on an image transfer belt, a test image with respect to a pattern used for diagnosing an image-quality state of a printout output by the image-forming apparatus,
obtain a test signal for the pattern corresponding to the test image via the sensor unit;
obtain image-quality state information indicating an image-quality state of the test image based on the test signal,
identify a type of a screen which corresponds to halftone information indicating a resolution of the printout based on the image-quality state information, and
perform a first image forming operation according to the identified type of the screen.

13. The image forming apparatus of claim 12, wherein the processor, by executing the instructions, is to:
obtain a standard deviation of the test signal as a first image-quality state value indicating the image-quality state of the test image;
obtain, as a second image-quality state value, a standard deviation calculated from a signal obtained by removing a low-frequency signal component from the test signal; or
obtain, as a third image-quality state value, a standard deviation calculated from a signal obtained by removing the low-frequency signal component and a high-frequency signal component from the test signal.

14. The image forming apparatus of claim 12, wherein the processor, by executing the instructions, in a case where a first image-quality state corresponding to the image-quality state information does not satisfy a reference image-quality condition, is to change a type of a first screen corresponding to a first lines per inch (LPI) set in the image forming apparatus to a type of a second screen corresponding to a second LPI less than the first LPI.

15. The image forming apparatus of claim 14, wherein the processor, by executing the instructions, in a case where a first consumable of the image forming apparatus is replaced, is to:
change the type of the second screen to the type of the first screen, and
perform a second image forming operation according to the type of the first screen.

* * * * *